(12) United States Patent
Johnston

(10) Patent No.: US 11,007,559 B2
(45) Date of Patent: May 18, 2021

(54) TUBE SHAPING TOOL

(71) Applicant: Solar Turbines Incorporated, San Diego, CA (US)

(72) Inventor: Ronald K. Johnston, El Cajon, CA (US)

(73) Assignee: Solar Turbines Incorporated, San Diego, CA (US)

( * ) Notice: Subject to any disclaimer, the term of this patent is extended or adjusted under 35 U.S.C. 154(b) by 174 days.

(21) Appl. No.: 16/372,623

(22) Filed: Apr. 2, 2019

(65) Prior Publication Data

US 2020/0316664 A1 Oct. 8, 2020

(51) Int. Cl.
*B21C 37/30* (2006.01)
*B24B 23/02* (2006.01)
*B21D 19/04* (2006.01)
*B21D 19/00* (2006.01)

(52) U.S. Cl.
CPC ............ *B21C 37/30* (2013.01); *B21D 19/005* (2013.01); *B21D 19/04* (2013.01); *B24B 23/02* (2013.01)

(58) Field of Classification Search
CPC ........ B21D 19/005; B21D 19/04; B21C 37/30
See application file for complete search history.

(56) References Cited

U.S. PATENT DOCUMENTS

| | | | |
|---|---|---|---|
| 3,875,831 A * | 4/1975 | Beauloye | B23B 5/163 82/113 |
| 4,246,728 A | 1/1981 | Leasher | |
| 4,658,615 A * | 4/1987 | Mitchell | B21D 19/005 72/12.7 |
| 5,038,525 A | 8/1991 | Gardner | |
| 5,099,537 A | 3/1992 | Denny | |
| 6,497,022 B1 | 12/2002 | Carter | |
| 9,022,704 B1 * | 5/2015 | Goodman | F42B 33/10 409/131 |
| 2017/0072551 A1 | 3/2017 | Moore | |

FOREIGN PATENT DOCUMENTS

| | | | | |
|---|---|---|---|---|
| DE | 3500349 C1 * | 4/1986 | ............ | B23B 5/161 |
| EP | 407340 A1 | 1/1991 | | |
| JP | 57202930 A * | 6/1981 | ............ | B21D 19/04 |
| KR | 200466559 Y1 * | 4/2013 | ........... | B21D 19/005 |
| KR | 200466559 Y1 | 4/2013 | | |
| WO | 1997000154 A1 | 1/1997 | | |

* cited by examiner

*Primary Examiner* — Adam J Eiseman
*Assistant Examiner* — Chastin M. Brundidge
(74) *Attorney, Agent, or Firm* — Procopio, Cory, Hargreaves & Savitch LLP

(57) ABSTRACT

This disclosure provides a tube shaping tool for a torque mechanism to modify a tube end. The tube shaping tool can include a cup and an internal assembly. The internal tube assembly can include a stem and an internal body. The stem can be received by the torque mechanism and transmit torque generated from the torque mechanism to the components of the tube shaping tool. The tube shaping tool can roll form the outside diameter of the tube end using standard bearings and a flange bearing attached to the internal body. The flange bearing can also include a flange that can provide facing of the tube end.

18 Claims, 3 Drawing Sheets

TUBE SHAPING TOOL

TECHNICAL FIELD

This disclosure relates to a tool. More specifically, this disclosure relates to a tube shaping tool.

BACKGROUND

Tools are used to removed burrs and sharp edges from the cut ends of tubing. These burrs and sharp edges are removed from the outside surfaces of tubing ends to facilitate the attachment of couplings to tubing ends. Burrs and sharp edges are removed from inside surfaces of tubing ends to ensure free flow of liquids and gases through tubes. Burrs and sharp edges are also removed from the inside surfaces of conduit pipe ends to prevent damage to the insulation on wires that are to be pulled through the conduits.

U.S. Pat. No. 6,497,022 to Carter describes a pipe end burnishing tool that has a tool shank with an axis of rotation, a first end adapted to be clamped to a drill chuck, a second end, and a stop face on the second end. A cup member is driven by the tool shank and axially moveable along the axis of rotation. An inside member is also driven by the shank and axially movable along the axis of rotation. A cup spring urges the cup toward the stop face. An inside member spring urges the inside member away from the first end and also urges the cup member toward the first end. Conical burnishing faces on the cup and the inside member cooperate to burnish pipe ends. These burnishing faces float in line with the ends of pipes.

The present disclosure is directed toward overcoming one or more of the problems discovered by the inventors.

SUMMARY

In general, this disclosure describes a tube shaping tool adapted for a torque mechanism. The systems, methods and assemblies of this disclosure each have several innovative aspects, no single one of which is solely responsible for the desirable attributes disclosed herein.

The tube shaping tool comprising an internal body radially centered on a center axis that is longitudinal to the internal body. The internal body including a stem extending from the internal body along the center axis and formed to be detachably engaged with the torque mechanism. The internal body further including a body outward surface disposed along a radial perimeter of the internal body, a body forward surface disposed opposite from the stem, extending inward from the body outward surface, and internal fastener apertures extending from the body forward surface into the internal body.

The tube shaping tool further comprising a plurality of standard bearings disposed adjacent to the body forward surface. Each of the plurality of standard bearings having a bearing stationary portion, and a bearing outward surface disposed radially opposite the bearing stationary portion with respect to each of the plurality of standard bearings, the bearing outward surface angled away from the center axis. The tube shaping tool further comprising a flange bearing disposed adjacent to the body forward surface. The flange bearing having a flange bearing stationary portion, a flange bearing outward surface disposed radially opposite the bearing stationary portion with respect to the flange bearing, the flange bearing outward surface angled away from the center axis, and a flange extending outward from the flange bearing outward surface with respect to the flange bearing.

The tube shaping tool further comprising a plurality of fasteners connecting the plurality of standard bearings and the flange bearing to the body forward surface, the plurality of fasteners partially disposed in the internal fastener apertures.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. In some instances, reference numbers are left out of the figures for ease of viewability.

Figure 1:
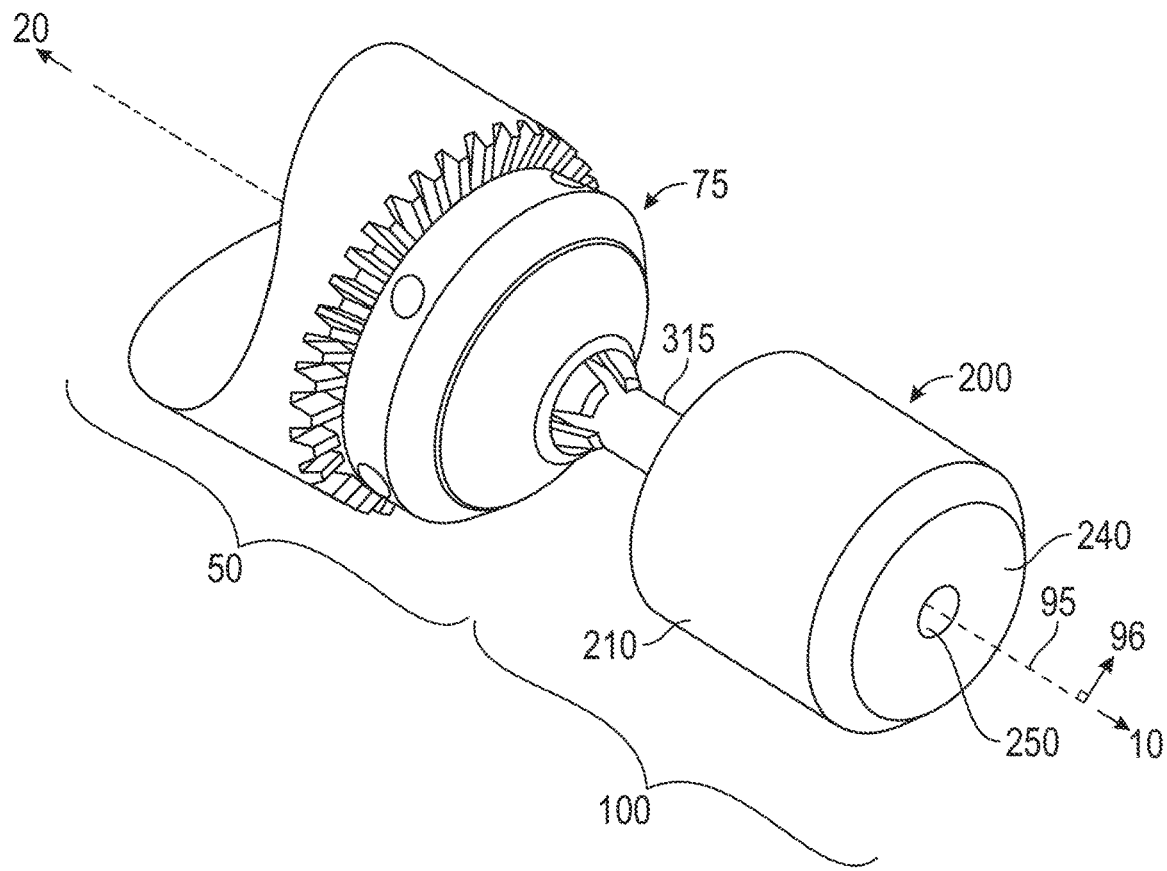
FIG. 1 is a perspective view of an exemplary tube shaping tool with a torque mechanism.

FIG. 1 is a perspective view of an exemplary tube shaping tool with a torque mechanism. Some of the surfaces have been left out or exaggerated (here and in other figures) for clarity and ease of explanation. The disclosure may reference a forward direction 10 and an aft direction 20. Generally, references to the aft direction 20 are towards the power receiving end such as a torque mechanism 50. Generally, references to the forward direction 10 are away from the torque mechanism 50.

In addition, the disclosure may generally reference a center axis 95 of rotation of the torque mechanism 50 and tube shaping tool 100, which may be generally defined by the longitudinal axis of the torque mechanism 50 and the tube shaping tool 100. All references to radial, axial, and circumferential directions and measures refer to center axis 95, unless specified otherwise, and terms such as "inward" and "outward" generally indicate a lesser or greater radial distance from center axis 95, wherein a radial 96 may be in any direction perpendicular and radiating outward from center axis 95.

The tube shaping tool 100 can include a coupling mechanism such as a stem 315 and a cup 200. The stem 315 may have a cylindrical shape and formed to be detachably engaged with a bushing assembly 75 of the torque mechanism 50. The torque mechanism 50 can deliver torque to the bushing assembly 75. The bushing assembly 75 can transmit the torque to the stem 315 of the tube shaping tool 100. Alternatively, other coupling mechanisms to couple the tube shaping tool 100 to a source of torque can be used such as an adapter and rotating tool holder.

The cup 200 can include a cup body portion 210 and a cup bevel portion 230. The cup body portion 210 can be shaped as a hollow cylinder radially centered on and extending along the center axis 95. The cup body portion 210 can be the most outwardly disposed feature of the cup 200.

The cup bevel portion 230 can be radially centered on the center axis 95 and axially extend in the forward direction 10 from the cup body portion 210. The cup bevel portion 230 can extend inward from proximate the cup body portion 210. The cup bevel portion 230 can include a cup forward surface 240 disposed on the forward direction 10 facing surface of the cup bevel portion 230. The cup forward surface 240 can extend inward from the most forward edge of the cup bevel portion 230 and be radially centered on the center axis 95. The cup forward surface 240 can be shaped as an annulus.

The cup bevel portion 230 can axially extend between the cup body portion 210 to the cup forward surface 240. A cup tube aperture 250 can be shaped like a cylinder and sized base on tubing size. The cup tube aperture 250 can be centered on the center axis 95 and extend axially from the cup forward surface 240 towards the aft direction 20.

The cup bevel portion 230 can extend radially inward from the cup body portion 210 to the cup tube aperture 250. The cup bevel portion 230 may be shaped as a truncated hollow cone and may be radially larger adjacent the cup body portion 210 than adjacent the cup forward surface 240. In other words, the cup bevel portion 230 can taper from adjacent the cup body portion 210 towards the forward direction 10.

Figure 2:
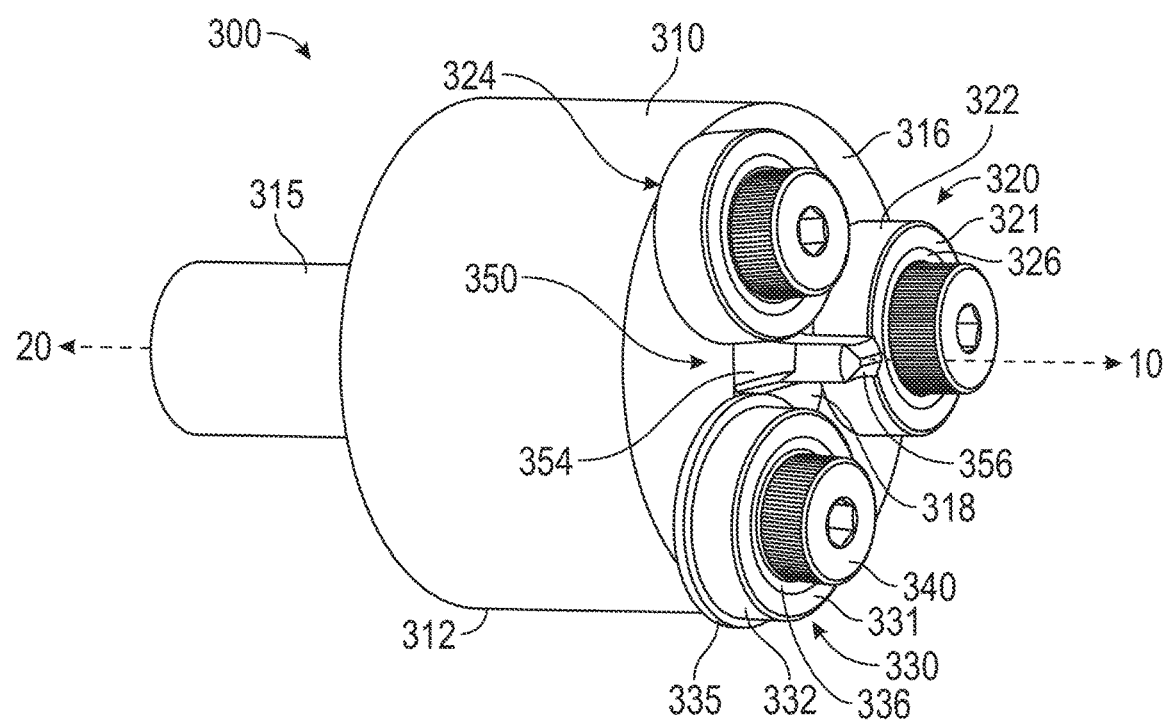
FIG. 2 is a perspective view of the internal assembly of the tube shaping tool.

FIG. 2 is a perspective view of the internal assembly of the tube shaping tool 100 of FIG. 1. An internal assembly 300 can include an internal body 310 and a body outward surface 312. A longitudinal axis of the internal body 310 can be centered on center axis 95. The internal body 310 can be shaped as a cylinder and include the stem 315 extending along the longitudinal axis in the aft direction 20 away from the internal body 310. The stem 315 may be integral with the internal body 310 or can be attached via welding, brazing, fastening or other attachment mechanisms of the like. The stem 315 can be radially centered on the center axis 95 and be shaped like a cylinder. The body outward surface 312 is the outward facing surface disposed along the radial perimeter of the internal body 310. In other words the body outward surface 312 is the outer surface of the cylinder.

The internal body 310 can include a body forward surface 316 and a body tool bit aperture 318. The body forward surface 316 can be radially centered on the center axis 95 and extend between the body outward surface 312 to the body tool bit aperture 318. The body forward surface 316 may extend radially inward from the body outward surface 312 and be shaped as a truncated hollow cone. The body forward surface 316 can taper from adjacent the body outward surface 312 inwards in a direction away from the stem 315 that is towards the forward direction 10.

The internal assembly 300 can further include fasteners 340 (only the forward portion can be seen in FIG. 2), standard bearings 320, a flange bearing 330, and a tool bit 350. The standard bearings 320 and the flange bearing 330 can be disposed between the fasteners 340 and the body forward surface 316. Though three bearings (two bearings and one flange bearing) are depicted in the figure, one, two, three, four, five or more bearings can be used. The standard bearings 320 can include a bearing forward surface 321, a bearing outward surface 322, and a bearing stationary portion 326. The bearing forward surface 321 can be disposed opposite from the body forward surface 316. The bearing outward surface 322 can be the radial perimeter surface of each of the standard bearings 320. The bearing outward surface 322 can be disposed radially outward of the fasteners 340 with respect to the fasteners 340. The bearing stationary portion 326 can be disposed inward of the bearing forward surface 321 with respect to the standard bearing 320 and can extend from the forward direction 10 to the aft direction 20 of the standard bearings 320. standard bearings 320

Similarly, the flange bearing 330 can include a flange bearing forward surface 331, a flange bearing outward surface 332, and a flange bearing stationary portion 336. The flange bearing forward surface 331 can be disposed opposite from the body forward surface 316. The flange bearing outward surface 332 can be the radial perimeter surface of each of the flange bearing 330. The flange bearing outward surface 332 can be disposed radially outward of the fasteners 340 with respect to the fasteners 340. The flange bearing stationary portion 336 can be disposed inward of the flange bearing forward surface 331 with respect to the flange bearing 330 and can extend from the forward direction 10 to the aft direction 20 of the flange bearing 330.

The flange bearing 330 can also include a flange 335. The flange 335 may extend radially outward from the flange bearing 330. In other words the flange 335 can extend outward from the flange bearing outward surface 332 with respect to the flange bearing 330. The flange 335 may be disposed adjacent to the body forward surface 316. The flange 335 may be shaped as an annulus. A portion of the standard bearings 320 and a portion of the flange 335 can be disposed outward from the internal body 310. The standard bearings 320 may comprise ball bearings or tapered roller bearings such as Ball Bearing Part Number 60355K43 from McMaster-Carr. The flange bearing 330 may comprise a ball bearing or a tapered roller bearing such as a Self-Aligning Flanged Ball Bearing Part Number 1293N2 from McMaster-Carr.

Each standard bearing 320 and flange bearing 330 can connect to the internal body 310 with a respective fastener 340. A portion of the fasteners 340 may be disposed adjacent to and through the bearing stationary portion 326 and the flange bearing stationary portion 336. A portion of the fasteners 340 may extend from adjacent the bearing forward surface 321 and the flange bearing forward surface 331 towards the forward direction 10. The fasteners 340 can detachably engage with the internal body 310. The fasteners 340 may comprise of screws, bolts, rivets, pins, welds, or other mechanical fasteners of the like.

The tool bit 350 can include a tool bit tip 356 and tool bit flutes 354. The tool bit tip 356 can be disposed radially inward from the standard bearings 320 and flange bearing 330. The tool bit tip 356 can extend from proximate the forward end of the body tool bit aperture 318 towards the forward direction 10 axially along the center axis 95. The forward end of the tool bit tip 356 can come to an edge or a point. The aft end of the tool bit tip 356 can have a radial cross-section shaped with two concave arcs and two convex arcs.

The tool bit flutes 354 can extend from the aft end of the tool bit tip 356 towards the aft direction 20 towards the stem 315. The tool bit flutes 354 can be shaped as a frustum. A portion of the tool bit flutes 354 can be disposed within the internal body 310, adjacent to the tool bit aperture 318.

Figure 3:
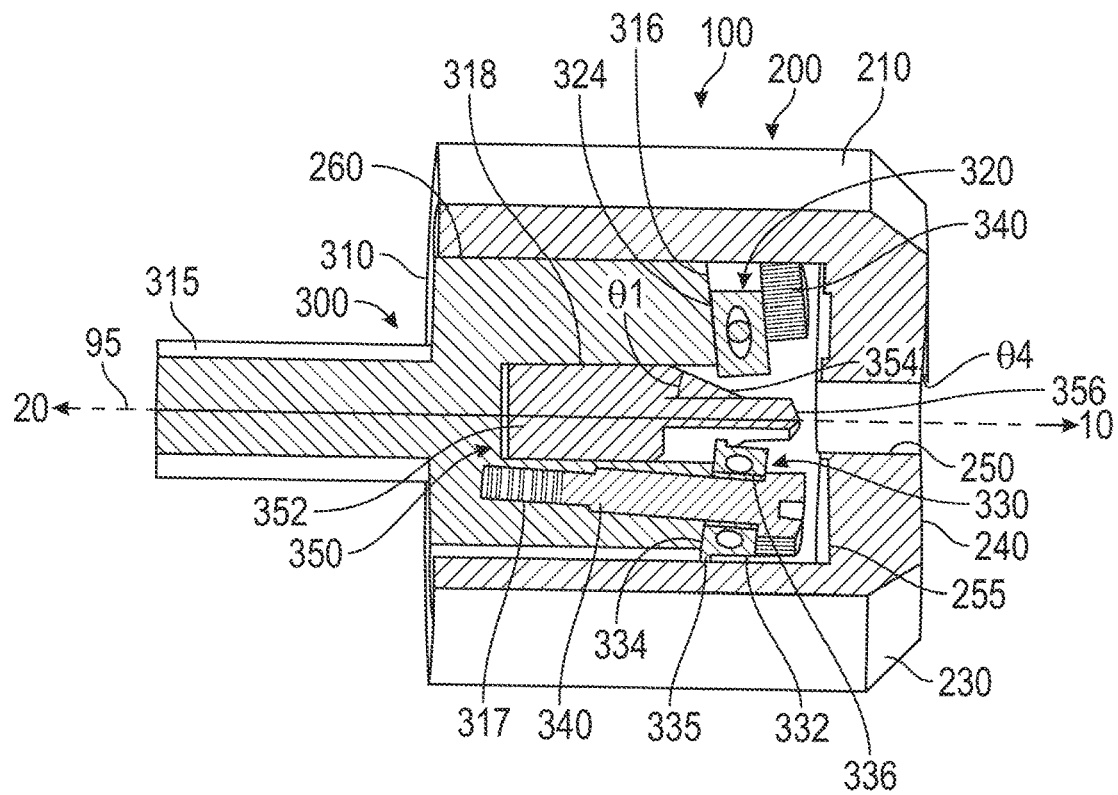
FIG. 3 is an elevation view of the tube shaping tool of FIG. 1 with a portion removed.

FIG. 3 is an elevation view of the tube shaping tool of FIG. 1 with a portion removed. The cup 200 is shown over the internal assembly 300. The majority of the stem 315 can be disposed longitudely outside of the cup 200 with the remaining internal assembly 300 disposed within the cup 200. The cup body portion 210 can include a cup internal aperture 260 that can be shaped as a cylinder radially centered about the center axis 95. The cup internal aperture 260 can surface inward towards the center axis 95. The body outward surface 312 can be disposed adjacent to the cup internal aperture 260.

The body tool bit aperture 318 can extend from the inward edge of body forward surface 316 and be radially centered on the center axis 95. The body tool bit aperture 318 can extend along the center axis 95 from the body forward surface 316 towards the stem 315 in the aft direction 20 and have a cylindrical shape.

The cup bevel portion 230 can be recessed at the cup forward surface 240. The recess may be in the shape of a truncated cone with a diameter disposed at the inward edge of the cup bevel portion 230 extending in the aft direction 20 with a smaller diameter disposed at the forward edge of cup tube aperture 250.

The tool bit flutes 354 can be angled at a tool bit flutes angle θ1 that is with respect to the center axis 95. The tool bit flutes angle θ1 can range from 40 to 80 degrees in the outward direction 20. The tool bit flutes angle θ1 may be 60 degrees in the outward direction 20.

The cup forward surface 240 can be angled at a cup forward surface angle θ4 with respect to the radial plane from the inward edge of the cup bevel portion 230 to the center axis 95. The cup forward surface angle θ4 can range from 0 to 60 degrees in both the aft direction 20 and the forward direction 10.

The cup tube aperture 250 can be formed by inward faces of the cup body portion 210 and the cup bevel portion 230. The cup tube aperture 250 can be an inward radial perimeter such as the most inward portion of the cup 200.

The fasteners 340 can extend through the standard bearings 320, through the body forward surface 316, and into the internal body 310. The internal body 310 can include an internal fastener aperture 317 extending from the body forward surface 316 into the internal body 310 and towards the stem 315. The internal fastener aperture 317 can be shaped as a tiered cylinder that contours the fasteners 340 such as having a cylindrical surface proximate the aft end and a larger diameter cylindrical surface proximate the forward end. The internal body 310 can include multiple internal fastener apertures 317 (only one shown) to accommodate multiple fasteners 340. The fasteners 340 can each connect to one of the internal fastener apertures 317. The fasteners 340 can be disposed outward from the body tool bit aperture 318. The fasteners 340 can be oriented perpendicular to the body forward surface 316.

The tube shaping tool 100 can include a fastener such as a fastening screw (not shown) that connects the cup body portion 210 to the internal body 310. Similarly, the tube shaping tool 100 can include a fastening screw (not shown) that connects the tool bit 350 to the internal body 310. The tool bit 350 can further include a tool bit shank 352 that extends from the aft end of the tool bit flutes 354 towards the aft direction 20. The tool bit shank 352 can have a cylindrical shape and be radially centered on the center axis 95. The tool bit shank 352 can be disposed inward of and within the body tool bit aperture 318. A portion of the tool bit shank 352 can extend more outward than the tool bit tip 356.

The standard bearings 320 can include a bearing aft surface 324 that can be disposed adjacent to the body forward surface 316. In other words the bearing aft surface 324 can be disposed parallel with the body forward surface 316. The flange bearings 330 can include a flange bearing aft surface 334 that can be disposed adjacent to the body forward surface 316. In other words the flange bearing aft surface 334 can be disposed parallel with the body forward surface 316.

The standard bearings 320 and flange bearing 330 are disposed inward from the cup internal aperture 260. The standard bearings 320 can include the bearing stationary portion 326 disposed opposite of the bearing outward surface 322. The flange bearing 330 can include the bearing stationary portion 326 disposed opposite of the flange bearing outward surface 332.

The flange 335 can be in contact with the cup internal aperture 260. The standard bearings 320 can be disposed proximate to the cup internal aperture 260 and may not be in contact with the cup internal aperture 260.

The cup body portion 210 can further include a cup internal aft surface 255 that radially extends between the cup tube aperture 250 and the cup internal aperture 260. The cup internal aft surface 255 can face the aft direction 20 and be shaped as an annulus.

Figure 4:
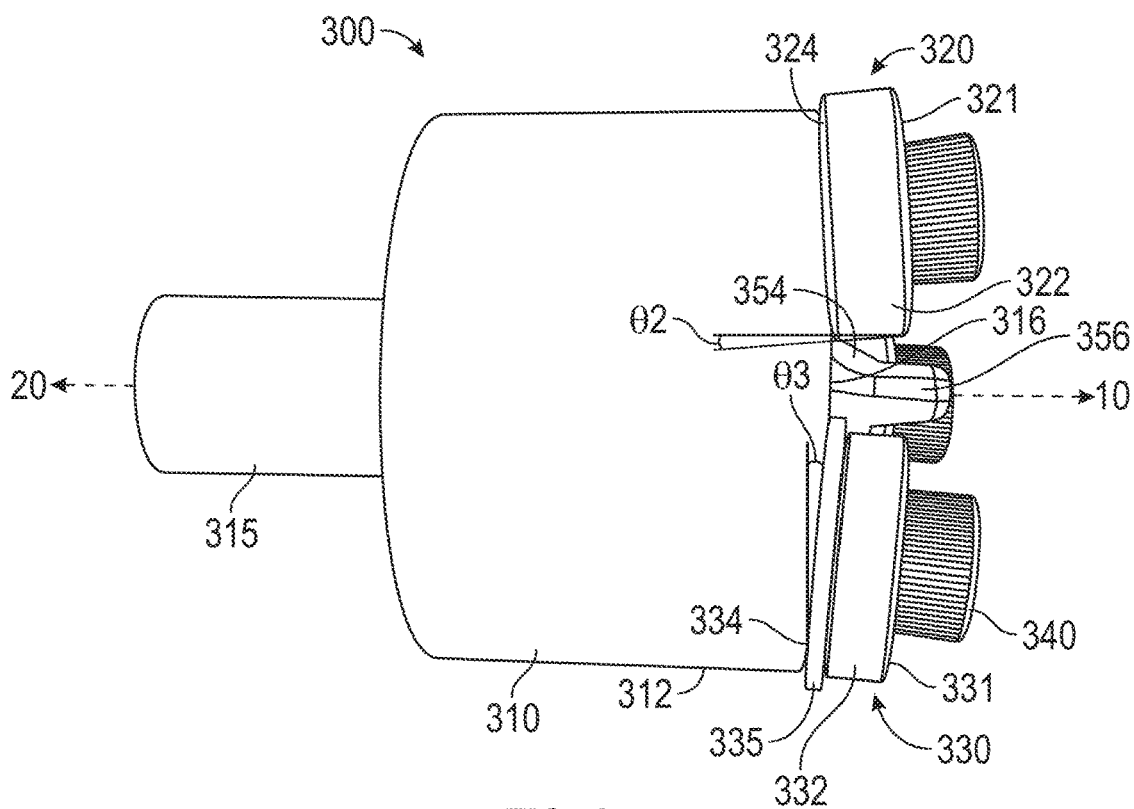
FIG. 4 is an elevation view of the internal assembly of FIG. 2.

FIG. 4 is an elevation view of the attachment member of FIG. 2. The body forward surface 316 can be angled at a body forward surface angle θ3 with respect to the radial plane located from the outward edge of the body forward surface 316 to the center axis 95. The body forward surface angle θ3 can range from 0 to 15 degrees in the forward direction 10. The body forward surface angle θ3 can range from 3 to 6 degrees in the forward direction 10. The body forward surface angle θ3 can range from 4 to 5 degrees in the forward direction 10. The body forward surface angle θ3 can be 4.5 degrees in the forward direction 10.

The standard bearings 320 and flange bearing 330 can be angled at a bearing outward surface angle θ2 that is with respect to the center axis 95. The bearing outward surface angle θ2 can match the body forward surface angle θ3 and be oriented perpendicular to the body forward surface angle θ3. The bearing outward surface angle θ2 can range from 0 to 15 degrees from the center axis 95. The bearing outward surface angle θ2 can range from 3 to 6 from the center axis 95. The bearing outward surface angle θ2 can range from 4 to 5 degrees from the center axis 95. The bearing outward surface angle θ2 can be 4.5 degrees from the center axis 95. The standard bearings 320 and flange bearing 330 may comprise ball bearings with no taper. The standard bearings 320 and flange bearing 330 may comprise tapered roller bearings with a taper that can increase or decrease the bearing outward surface angle θ2 depending on the body forward surface angle θ3.

Figure 5:
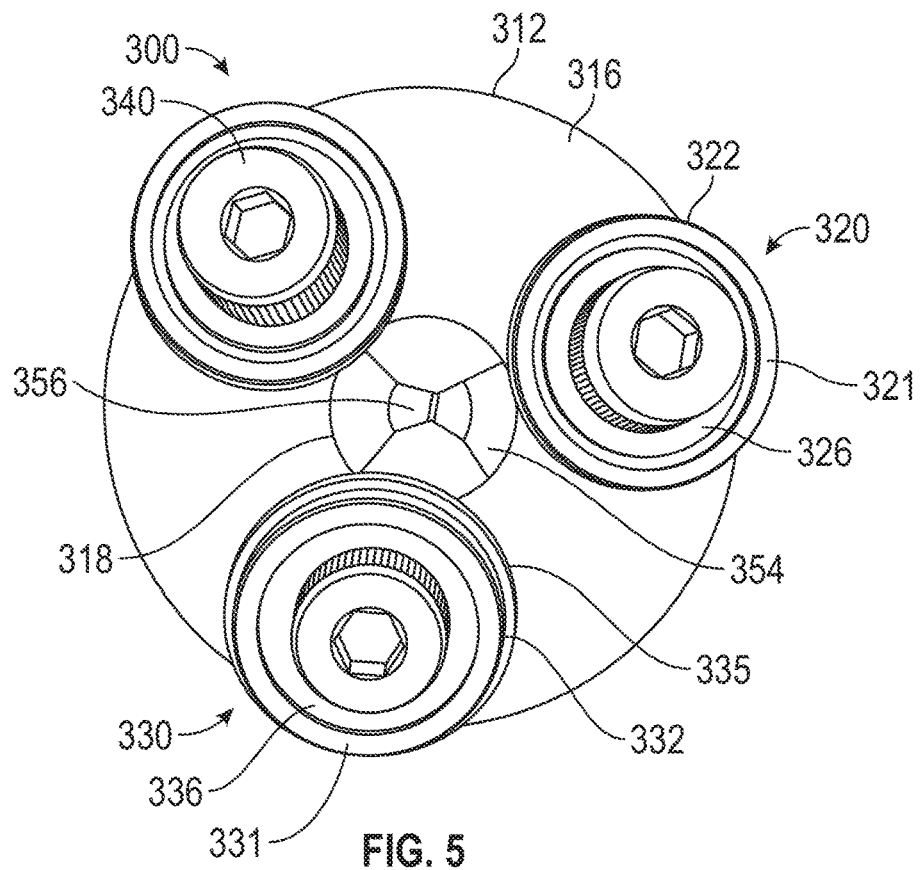
FIG. 5 is a forward end view of the internal assembly shown in FIG. 2.

FIG. 5 is a forward end view of the attachment member shown in FIG. 2. The radial centers of the standard bearings 320, flange bearing 330, and fasteners 340 can be positioned at equal radial distances from the center axis 95. The linear distance between the radial center of adjacent sets of standard bearings 320, flange bearing 330, and fasteners 340 can be equal. The radial centers of the standard bearings 320, flange bearing 330, and fasteners 340 can be radially spaced from adjacent radial centers of other standard bearings 320, or flange bearing 330, and fasteners 340 by 120 degrees with respect to the center axis 95.

Figure 6:
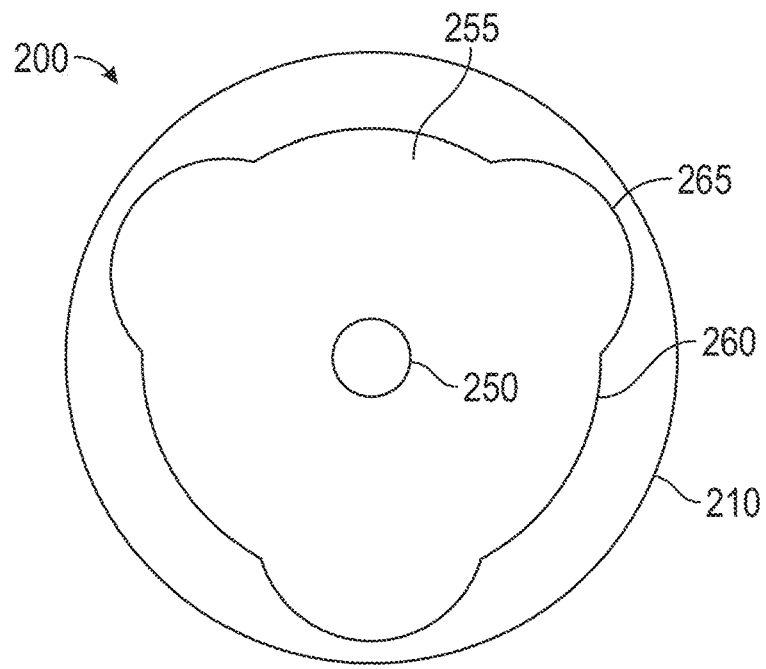
FIG. 6 is a rear view of the cup shown in FIG. 1.

FIG. 6 is a rear view of the cup shown in FIG. 1. The cup internal aperture 260 can include cup cutouts 265. The cup cutouts 265 can axially extend from the aft end of the cup body portion 210 to the cup internal aft surface 255. The cup cutouts 265 can have an arc shape and can have a radius that is equal to or greater than the radius of the flange 335. The cup internal aperture 260 can include a range of cup cutouts 265 including one, two, three, four, five, or more cup cutouts 265. The cup cutouts 265 can be equally spaced from each other and have the same radial spacing from the center axis 95. The cup cutouts 265 can have concave shape that faces the center axis 95.

INDUSTRIAL APPLICABILITY

Tubing can include burrs that remain attached after tubing modification processes. These burrs are usually unwanted pieces of material and they are removed with a tool. Tubing may also have uneven ends, sharp edges, or other physical factors that need to be modified before the tubing can be used. The tube shaping tool 100 can be used with a torque mechanism 50 to modify and reshape the ends of tubing. The torque mechanism 50 can comprise a portable drill, an electric or pneumatic beveling machine, or other rotary devices that can be used to provide a source of torque.

The tube shaping tool 100 can include the cup 200 and the internal assembly 300. The internal assembly 300 includes the stem 315 that can be accepted into the bushing assembly 75. The torque mechanism 50 transmits torque to the bushing assembly 75. The bushing assembly 75 transmits torque to the stem 315 and rotates the internal body 310 about the center axis 95. The cup 200 can be connected to the internal assembly 300 with a fastening screw, allowing the cup 200 to rotate with the internal assembly 300. The fasteners 340 (for example, a threaded bolt) can connect the standard bearings 320 and the flange bearing 330 to the internal body 310. The fasteners 340 can connect with and extend through the bearing stationary portions 326 and the flange bearing stationary portion 336. The fasteners 340 can connect with the internal fastener apertures 317. The standard bearings 320 and flange bearing 330 can rotate around the center axis 95 with the internal assembly 300 and a portion of the standard bearing 320 and flange bearing 330 can be free to rotate around the fasteners 340. The bearing stationary portion 326 can remain stationary while the bearing forward surface 321, bearing outward surface 322, and bearing aft surface 324, can rotate about the fasteners 340 with respect to the fasteners 340. Similarly, the flange bearing stationary portion 336 can remain stationary while the flange bearing forward surface 331, flange bearing outward surface 332, flange bearing aft surface 334, and flange 335 can rotate about the fasteners 340 with respect to the fasteners 340.

The flange 335 can contact one of the cup cutouts 265. The cup cutouts 265 can receive the torque from the cup internal aperture 260 and transfer the torque to the flange 335. The flange 335 can transmit the received torque to the at least one flange bearing 323. In an example, a second and a third flange bearing can receive torque from the cup cutouts 265. The standard bearings 320 and flange bearing 330 may not have a taper along the bearing outward surface 322 and flange bearing outward surface 332, respectively, and can allow the standard bearings 320 and flange bearing 330 to main a constant rotation along the bearing outward surface 322. The standard bearings 320 and flange bearing 330 can comprise of metal that is harder than the tubing it is shape forming. The tool bit 350 can receive the torque from the internal body 310 through the body tool bit aperture 318 and transmit torque to the tool bit shank 352, tool bit flutes 354, and tool bit tip 356.

The end of a tube can be inserted from the forward direction 10 towards the aft direction 20 into the tube shaping tool 100 via the cup tube aperture 250. The cup tube aperture 250 can be sized to accept the appropriate sized tube. The cup tube aperture 250 can align the orientation of the tube to be centered on the center axis 95. The tubing can be inserted beyond the forward end of the tool bit tip 356. The tool bit tip 356 can remove burrs that extend near the radial center of the tubing. The tube can be inserted beyond the bearing forward surface 321 and engage the bearing outward surface 322. The bearing outward surface 322 from each of the standard bearings 320 and the flange bearing outward surface 332 from the flange bearing 330 can be arranged to operate together to roll form the outer diameter of the tubing, without cutting or creating a burr, to create a bevel on the outer diameter of the tubing. The standard bearings 320 and flange bearing 330 keep the tubing centered on the center axis 95 and increase the outward bevel length as the tubing is further inserted in the aft direction 20. The amount of outward bevel is dependent on the bearing outward surface angle θ2. The bevel on the outward edge of the tubing can remove burrs and facilitate mating the tubing with a fitting.

The tubing can be inserted beyond the forward end of the tool bit flutes 354. The tool bit flutes 354 bevel the inside diameter of the tubing and can remove burrs and excess material disposed within the inside diameter. The roll forming performed by the bearings 320 and flange bearing 330 can displace material inwards with respect to tubing. The displaced material from roll forming can then be removed by the tool bit flutes 354. The amount of inward bevel is dependent on the tool bit flute angle θ1. The bevel on the inward edge of the tubing can remove burrs and facilitate mating the tubing with a fitting.

The tubing can be further inserted to contact the flange 335. The flange 335 can comprise of harder material than the tubing material. The flange 335 can provide facing to the tubing end upon contact, removing burrs and trimming the tube end to have a generally even and flat surface.

Tubing can come in a variety of sizes. Several of the described features can be sized and adjusted to accommodate the range in tubing sizes. The standard bearings 320 and flange bearing 330 can range in diameter to match the outer diameter of tubing. The thickness of the standard bearing 320 and flange bearing 330 can range in size to provide the necessary bevel length to the outside diameter of the tubing. The cup tube aperture 250 can be sized accommodate the outer diameter of the tubing. The tool bit tip 356 and the tool bit flutes 354 can be sized to accommodate the inside diameter of the tubing. The tool bit flutes 354 and tool bit flute angle θ1 can be sized to provide the necessary bevel length and bevel angle to the inside diameter of the tubing. The internal forward surface angle θ3 and bearing outward surface angle θ2 can vary to provide the necessary bevel angle to the outside diameter of the tubing. The length of the flange 335 protruding outward can be sized to have the appropriate surface amount to provide facing to tubing with varying thicknesses. The cup 200 and internal body 310 can vary in size to accommodate the varying size of the features described above.

The preceding detailed description is merely exemplary in nature and is not intended to limit the invention or the application and uses of the invention. The described embodiments are not limited to use in conjunction with a particular type of torque mechanism. Hence, although the present disclosure, for convenience of explanation, depicts and describes a particular tube shaping tool, it will be appreciated that the tube shaping tool in accordance with this disclosure can be implemented in various other configurations, can be used with various other types of rotary devices. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be understood that the benefits and advantages described above may relate to one embodiment or may relate to several embodiments. The embodiments are not limited to those that have any or all of the stated benefits and advantages.

What is claimed is:

1. A tube shaping tool for a torque mechanism that provides a source of torque, the tube shaping tool comprising:
   an internal body radially centered on a center axis that is longitudinal to the internal body, including
      a stem extending from the internal body along the center axis and formed to be detachably engaged with the torque mechanism,
      a body outward surface disposed along a radial perimeter of the internal body,
      a body forward surface disposed opposite from the stem, extending inward from the body outward surface, and
      internal fastener apertures extending from the body forward surface into the internal body;
   a plurality of standard bearings disposed adjacent to the body forward surface, each of the plurality of standard bearings having
      a bearing stationary portion, and
      a bearing outward surface disposed radially opposite the bearing stationary portion with respect to each of the plurality of standard bearings, the bearing outward surface angled away from the center axis;
   a flange bearing disposed adjacent to the body forward surface, having
      a flange bearing stationary portion,
      a flange bearing outward surface disposed radially opposite the bearing stationary portion with respect to the flange bearing, the flange bearing outward surface angled away from the center axis, and
      a flange for facing a tube end extending outward from the flange bearing outward surface with respect to the flange bearing;
   a tool bit disposed on the internal body, radially inward of the plurality of standard bearings and the flange bearing, the tool bit having
      a tool bit shank disposed within the internal body,
      tool bit flutes extending from the tool bit shank, and
      a tool bit tip extending from the tool bit flutes; and
   a plurality of fasteners connecting the plurality of standard bearings and the flange bearing to the body forward surface, the plurality of fasteners partially disposed in the internal fastener apertures.

2. The tube shaping tool of claim 1, wherein the bearing outward surface and flange bearing outward surface are angled between 4 and 5 degrees with respect to the center axis.

3. The tube shaping tool of claim 2, wherein the body forward surface is angled between 4 and 5 degrees with respect to a radial plane oriented 90 degrees from the center axis.

4. The tube shaping tool of claim 1, wherein the bearing outward surface and flange bearing outward surface are perpendicular to the body forward surface.

5. The tube shaping tool of claim 1, wherein the plurality of standard bearings comprise two bearings.

6. The tube shaping tool of claim 1, wherein the plurality of standard bearings are ball bearings.

7. A tube shaping tool for shaping a tubing end, the tube shaping tool comprising:
   a cup body portion radially centered on a center axis that is longitudinal to the tube shaping tool, having
      a cup tube aperture disposed along an inward radial perimeter and formed to receive the tubing end, and
      a cup internal aperture disposed outward from the cup tube aperture and oriented inward towards the center axis;
   an internal body radially centered on the center axis, including
      a body outward surface disposed inward of and adjacent to the cup internal aperture,
      a body forward surface disposed within the cup body portion extending inward from the body outward surface, and
      a body tool bit aperture extending from the internal body along the center axis;
   a flange bearing disposed adjacent to the body forward surface, having
      a flange bearing stationary portion,
      a flange bearing outward surface disposed radially opposite the flange bearing stationary portion with respect to the flange bearing, the flange bearing outward surface angled away from the center axis, and
      a flange extending outward from the flange bearing outward surface with respect to the flange bearing, the flange in contact with the cup internal aperture;
   a plurality of standard bearings disposed adjacent to the body forward surface, having
      a bearing stationary portion, and
      a bearing outward surface radially opposite the bearing stationary portion with respect to each of the plurality of standard bearings, the bearing outward surface angled away from the center axis;
   a plurality of fasteners connecting the flange bearing and the plurality of standard bearings to the internal body; and
   a tool bit disposed radially inward of the body tool bit aperture, having
      a tool bit shank disposed within the internal body,
      tool bit flutes extending from the tool bit shank, and
      a tool bit tip extending from the tool bit flutes.

8. The tube shaping tool of claim 7, wherein the flange is formed to provide facing of the tubing end.

9. The tube shaping tool of claim 7, wherein the plurality of standard bearings are positioned to roll form an outer diameter of the tubing end.

10. The tube shaping tool of claim 7, wherein the tool bit shank is formed to remove burrs from the tubing end.

11. The tube shaping tool of claim 7, wherein the tool bit shank is formed to create a bevel to the tubing end.

12. The tube shaping tool of claim 7, wherein the plurality of standard bearings and the flange bearing are positioned to create a bevel to the tubing end.

13. The tube shaping tool of claim 7, wherein the flange is shaped as an annulus.

14. The tube shaping tool of claim 13, wherein the cup internal aperture includes cup cutouts shaped as an arc with a radius greater than an outer diameter of the flange.

15. A tube shaping tool to shape a tube with an outer diameter surface, an end face, and an inner diameter surface, the tube shaping tool comprising:
   an internal body shaped as a cylinder with a longitudinal axis;

a standard bearing disposed on the internal body and arranged to roll form a bevel to the outer diameter surface of the tube;

a flange bearing disposed on the internal body and arranged to operate with the standard bearing to roll form a bevel to the outer diameter surface of the tube, the flange bearing including a flange extending outward from the flange bearing with respect to the flange bearing, the flange having an annulus shape and formed to provide facing to the end face of the tube;

a tool bit disposed on the internal body, arranged to bevel the inner diameter surface of the tube; and a cup body portion shaped as a cylinder and formed to receive the internal body, having a cup tube aperture sized to receive the outer diameter surface of the tubing.

16. The tube shaping tool of claim 15, wherein the internal body further comprises:

a stem extending from the internal body along the longitudinal axis of the internal body;

a body outward surface oriented outward and shaped as a cylinder;

a body forward surface extending inward from the body outward surface and angled greater than 90 degrees from the axis;

a body tool bit aperture extending from the body forward surface towards the stem, centered on the longitudinal axis of the internal body; and a plurality of internal fastener apertures disposed outward from the body tool bit aperture and inward from the body outward surface, extending from the body forward surface towards the stem.

17. The tube shaping tool of claim 16, wherein the bearing outward surface and the flange bearing outward surface are angled between 4 and 5 degrees with respect to the center axis.

18. The tube shaping tool of claim 17, wherein the bearing outward surface and flange bearing outward surface are perpendicular to the body forward surface.

* * * * *